Aug. 4, 1964    J. WATT    3,143,327

ADAPTER UNITS FOR WHEEL BALANCING APPARATUS

Filed May 29, 1963

INVENTOR
JOHN WATT

Attys.

ns.patent.3143327

United States Patent Office
3,143,327
Patented Aug. 4, 1964

3,143,327
ADAPTER UNITS FOR WHEEL BALANCING APPARATUS
John Watt, Thornbury, Victoria, Australia, assignor to Replex Proprietary Limited, Brunswick, Victoria, Australia, a company incorporated of the State of Victoria
Filed May 29, 1963, Ser. No. 284,788
Claims priority, application Australia May 30, 1962
6 Claims. (Cl. 248—205)

This invention relates generally to the balancing of automobile and other like wheels and more particularly concerns adapter units whereby wheels having central apertures of various sizes may be mounted on a common general purpose wheel balancing apparatus in such a manner that the wheel being tested is located in a substantially horizontal plane.

Various types of wheel balancing apparatus are known but for convenience of description of the present invention, reference will be made by way of illustration only a wheel balancing apparatus which includes a wheel supporting unit having a substantially vertical axis for carrying a wheel either direct or with an adapter unit so that the wheel may be subsequently balanced by adding weights to its rim, if necessary. The wheel supporting unit itself is carried on a balancing bearing which includes a pair of complementary shaped bearings which, in use, are held slightly apart by means of an air film supplied thereto through a pipe line in order to give a substantially frictionless bearing support. The shape of the upper end portion of the wheel supporting unit itself is of conical formation or at least partly conical formation.

Sedan and like automobile wheels are made in a range of sizes which do not differ greatly and it is usually possible to design a wheel supporting unit capable of coping with most of the sizes at present in existence. When it is necessary to balance truck and bus wheels however it is found that due to the great variation in sizes available and also due to the great weight of these types of wheels, it is necessary to employ an adapter unit to enable the wheel supporting unit to carry the wheel.

Such adapter units are known and in order to affix one known type of adapter unit to a truck wheel, for example, the unit has to be held in position from one side of the wheel to be balanced and clamping means applied on the opposite side of the wheel whilst the wheel is held clear of the ground. The difficulty involved in performing this operation will be readily appreciated, bearing in mind the relatively heavy type of wheel involved.

Furthermore a relatively large stock of different sized adapter units must be maintained in order to correspond with the various different sizes of truck and bus wheels in use at present.

The primary object of the present invention is to provide an improved adapter unit for use with wheel balancing apparatus of the kind indicated and which is adaptable to various sized wheels and is easily fitted to such a wheel without the necessity of lifting the wheel from the ground.

In accordance with the present invention the improved adjustable adapter unit for wheel balancing apparatus of the kind indicated, includes a body portion adapted at its lower end for removable mounting on an upstanding supporting member which forms part of said balancing apparatus so that the main axis of said body portion is co-aligned with the axis of said supporting member, said body portion having a transverse flange extending at substantially right angles to the main axis of said body portion and which has formed therein three or more slots which extend between the outer edge portion of said flange and said body portion, three or more posts each of which extends through one of said slots and is slidable lengthwise therein and depends beneath the lower surface of said flange where it is provided with a pair of longitudinally spaced collars or abutments with a neck portion therebetween, a master control assembly and guide means operatively connecting and guiding said posts so that substantially the same movement may be simultaneously imparted thereto so as to cause them to move inwardly and outwardly in relation to said main axis whilst maintaining said posts equidistantly spaced from each other and from said main axis, and means for releasably retaining said posts in any of their adjusted operative positions so that when said retaining means are secured the upper surfaces of the lower collars or abutments are located in a common plane at substantially right angles to said main axis, the construction and arrangement of said parts being such that they remain balanced about said main axis irrespective of adjustment of said posts, whereby said adapter unit may be connected to a wheel to be balanced from one side thereof by retracting if necessary, the assembly of posts so that they may be passed through the usual central aperture in the wheel and then expanding said posts until their neck portions are in engagement with the inner periphery of the wheel defining said aperture with said lower collars or abutments located beneath said inner periphery so that when the adapter unit is fitted to said upstanding supporting member of the balancing apparatus, the wheel is suspended upon the lower collars or abutments of said posts.

Referring to the drawings which form part of this specification:

Figure 1:
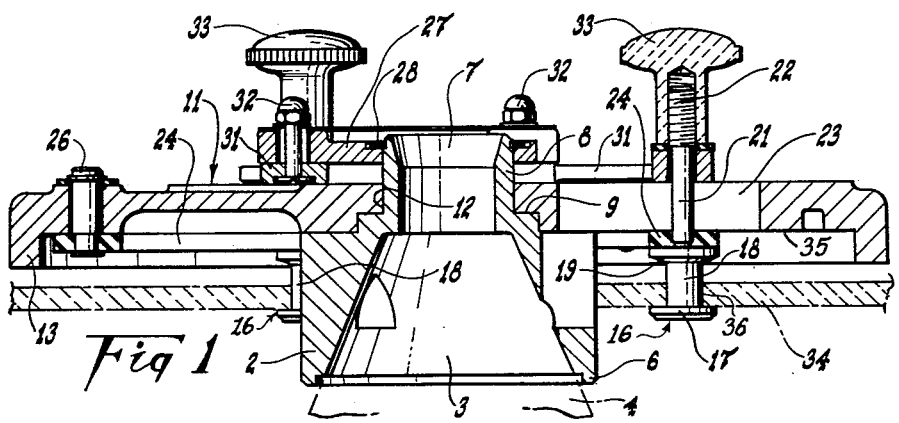
FIGURE 1 is a sectional elevation of an adapter unit in accordance with the present invention taken on the line I—I of FIGURE 2.
Figure 2:
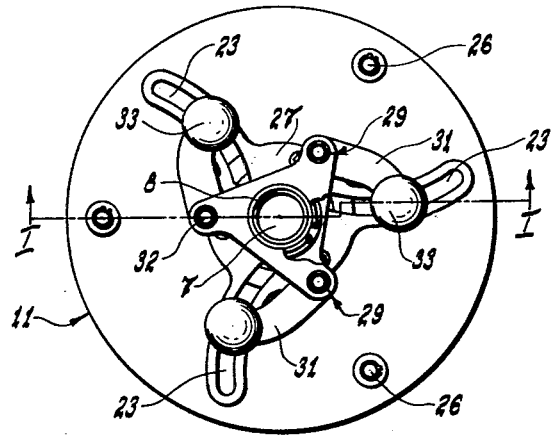
FIGURE 2 is a plan view of the parts seen in FIGURE 1, but on a reduced scale.
Figure 3:
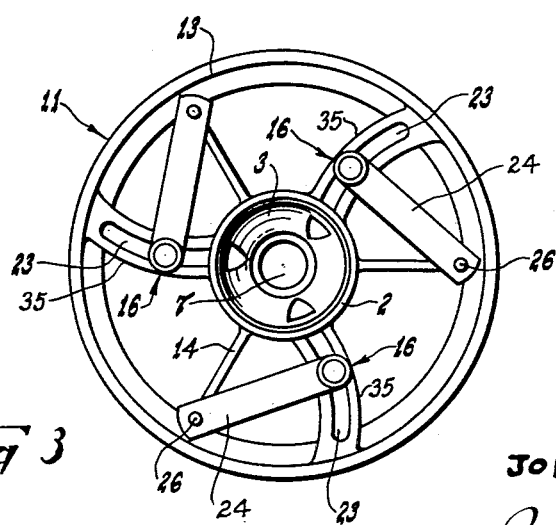
FIGURE 3 is an inverted plan view of FIGURE 2.

An improved adjustable adapter unit in accordance with the present invention includes a normally upright body portion 2 which may be of generally cylindrical shape and have at its lower end a downwardly opening axial recess 3. The shape of this recess as defined by its inner side wall is such as to be complementary with an upstanding supporting member 4 of a wheel balancing apparatus. If the latter is of the type shown in the United States patent specification mentioned, the inner wall of the recess 3 is of part conical shape and diverges towards its lower open end.

The accuracy of the balance effected by the wheel balancing apparatus depends to a large extent on the accurate machining of the mating walls of the adapter unit and the wheel supporting unit. Accordingly, in order to protect the inner wall of the axial recess 3 there is preferably provided on the lower end of the body portion an annular protecting shoulder 6 depending therefrom so as to clear the wheel supporting unit when in use. This protecting shoulder engages the ground or floor when the unit is set down.

Normally the upstanding supporting member 4 has in its upper end a visual indicator means, such as a spirit level, to observe when a wheel mounted on the apparatus is balanced and to provide uninterrupted observation of this indicator an open ended viewing hole 7 is preferably provided in the upper end 8 of the body portion communicating with the axial recess. The upper end of the body portion is preferably of a reduced outside diameter so as to provide an annular locating shoulder 9 for a purpose hereinafter described.

Associated with the foregoing is a transverse flange 11 preferably of circular form in plan with a central hole 12 to fit over the upper end of the body portion and engage the locating shoulder 9. The flange and body portion may be detachably connected together in any suitable manner such as by bolts or screws passing through the flange and the body portion.

The flange is preferably provided at its outer edge with a stiffening rim 13 depending in the same direction as the lower end of the body portion. Further stiffening of this supporting plate may be provided in the form of radial stiffening ribs 14.

Depending from the flange 11 are at least three circumferentially spaced wheel engaging posts 16 mounted so as to be movable in and out in relation to the centre of the flange. Each post has at its lower end a collar 17 adapted in use, to engage and support a wheel to be balanced and this collar is preferably of circular formation and carried at the lower end of a neck portion 18 of reduced diameter. The neck portion of each post may be bounded at its upper end by another collar 19 which overlies, but is spaced from, the lower collar and is also of similar formation in plan thus forming a reel like post. This upper collar preferably carries an upstanding central spindle 21 coaxial with the neck portion and which is screw threaded at its upper end as at 22.

The construction of the adapter unit is preferably such that each of these posts is accommodated within an arcuate slot 23 in the flange 11, said slots being substantially equally spaced circumferentially of said flange and extending between the body portion 2 and the outer edge portion of the flange. In order to ensure that each of the posts 16 is constrained to move in a predetermined path, guide means are provided, preferably in the form of swinging arms 24 each of which is connected at one end to the spindle of a post and pivotally connected at its opposite end as at 26 to the flange 11 near its outer periphery and at the centre of curvature of its associated arcuate slot 23. Such pivoted arms naturally constrain each post to movement in an arcuate path and it is for this reason that the aforesaid slots are of arcuate shape. Alternatively, said swinging arms may be omitted and the arcuate slots adapted to form part of said guide means.

In accordance with the invention the wheel engaging posts 16 are further constrained in their movement so as to move inwardly and outwardly along their slots in a synchronised manner so that they are all, at any one time, at a substantially constant distance from the axis of the body portion.

For this purpose, there is provided a master control assembly which includes a control member 27 rotatably connected for example to the upper end 8 of the body portion and removably retained in this position, by means of a circlip 28 or in any other suitable manner. The control member carries a series of circumferentially and equally spaced lugs 29, the number of lugs corresponding to the number of wheel engaging posts. Each lug is operatively connected to one wheel engaging post by means of a connecting link 31, pivotal connections 32 being provided so that as the control member is oscillated the wheel engaging posts 16 move inwardly and outwardly along their slots in the desired controlled manner.

When the wheel engaging posts are moved to a distance spaced from the axis of the body portion a desired amount they may be secured in this position by releasable retaining means preferably associated with each post. Such retaining means may be in the form of a plurality of screw threaded knobs or handles 33, one knob being associated with each post, by screwing it down on the upper screwed end 22 of its associated spindle so as to draw the upper collar 19 of each post 16 into close engagement with its associated swinging arm 24 thereby raising the latter into close engagement with the adjacent lower surface of a depending arcuate rib 35 which is preferably provided on the flange 11 and in which the associated slot 23 is formed.

It will be apparent that the swinging arms should be of substantially uniform thickness and that it is necessary to machine or otherwise finish the lower surfaces of the slotted ribs 35 so as to ensure that such surfaces are also located in substantially the same plane normal to the main axis of the body member.

In general truck and bus wheels have a central metal portion or disc 34 and a pneumatic tyre, the central portion carrying the usual tyre rim and having an axial aperture 36 defined by the inner marginal edge portion. When balancing such a wheel with known balancing apparatus the wheel is supported by means of the wheel supporting unit engaging the inner marginal edge portion of the disc.

In use, the improved adjustable adapter unit is connected to a wheel by laying the wheel down on its side so that its disc part of which normally extends sidewardly out of the central plane of the wheel, is uppermost. The wheel engaging posts 16 of the adapter unit are if necessary, first moved inwardly towards the axis of the body portion 2 and the unit is then centrally lowered over the wheel so that the wheel engaging posts extend downwardly through the axial aperture 36 in the disc. The wheel engaging posts are then moved outwardly so that their neck portions 18 engage the inner marginal edge portion of the disc. Care must be taken to ensure that all neck portions are in engagement with the disc with each associated collar 17 beneath the plane of the disc whereupon the retaining means are actuated so as to hold all the posts in their operative positions. The wheel is then raised at least on one side and lowered over the upstanding supporting member 4 of a wheel balancing apparatus of the type mentioned.

In the preferred embodiment described the co-operating conical surfaces of the adapter unit and the supporting member 4 engage and the wheel drops slightly so as to engage the lower collar 17 on each post. The balancing of the wheel can then be carried out in the normal way and the removal of the adapter unit subsequent to balancing the wheel is effected simply by releasing the retaining means, retracting the wheel engaging posts inwardly so as to clear the wheel disc and then removing the adapter unit.

The engagement and dis-engagement of the adapter unit with the wheel is simple and effective, as will be apparent and moreover it is unnecessary to lift the wheel so as to connect the adapter unit since all operations can be carried out from one side of the wheel.

Furthermore the one adapter unit may be designed so as to serve a wide range of different sized wheels having axial apertures 36 of different dimensions.

Obviously, in order to perform its designed function the adapter unit itself must be balanced about the axis of the body portion and adjustment of the assembled unit may be made by removing part of the metal by drilling the flange 11 on its heavy side to compensate for any lack of balance. Furthermore the upper surfaces of the lower collars 17 must be substantially coincident with a common plane normal to the axis of the body portion when occupying their operative positions. In practice this may be achieved by using matched posts which all have neck portions of substantially the same length.

Finally, although the description indicates that the body portion 2 and its flange 11 are separate integers, they may of course be integral.

It is also to be understood that various alterations, modifications and/or additions may be incorporated in the foregoing without departing from the ambit of the invention as defined by the appended claims.

Having now described my invention, what I claim as new and desire to secure by Letters Patent is:

1. An improved adjustable adapter unit for wheel balancing apparatus of the kind indicated including a body portion adapted at its lower end for removably mounting on an upstanding supporting member which forms part of said balancing apparatus so that the main axis of said body portion is coaligned with the axis of said supporting member, said body portion having a transverse flange extending at substantially right angles to the main axis of said body portion and which has formed therein at least three slots which extend between the outer edge portion of said flange and said body portion, at least three posts each of which extends through one of said slots and is slidable lengthwise therein and depends beneath the lower surface of said flange where it is provided with a pair of longitudinally spaced collarlike abutments with a neck portion therebetween, a master control assembly and guide means operatively connecting and guiding said posts so that substantially the same movement may be simultaneously imparted thereto so as to cause them to move inwardly and outwardly in relation to said main axis whilst maintaining said posts equidistantly spaced from each other and from said main axis, and means for releasably retaining said posts in any of their adjusted operative positions so that when said retaining means are secured the upper surfaces of the lower collarlike abutments are located in a common plane at substantially right angles to said main axis, the construction and arrangement of said parts being such that they remain balanced about said main axis irrespective of adjustment of said posts, whereby said adapter unit may be connected to a wheel to be balanced from one side thereof by retracting if necessary, the assembly of posts so that they may be passed through the usual central aperture in the wheel and then expanding said posts until their neck portions are in engagement with the inner periphery of the wheel defining said aperture with said lower collarlike abutments located beneath said inner periphery so that when the adapter unit is fitted to said upstanding supporting member of the balancing apparatus, the wheel is suspended upon the lower collarlike abutments of said posts.

2. Apparatus according to claim 1 wherein said master control assembly includes a rotatable member carried by said body portion so as to be capable of reciprocating about said main axis, said rotatable member being provided with a plurality of circumferentially spaced pivotal connections one for each of said posts and which are also equidistantly spaced from each other and from said main axis, a plurality of links which are of substantially the same effective length, each of which is connected at one end to one of said pivotal connections and at its opposite end to one of said posts.

3. Apparatus according to claim 1 wherein said guide means include a plurality of swinging arms, one for each of said posts, and which are of substantially the same effective length and pivotally connected to said flange at circumferentially spaced points which are equidistantly spaced from each other and from said main axis so that the free ends of said arms which are connected to said posts may swing towards and away from said body portion.

4. Apparatus according to claim 1 wherein said guide means include said slots which are of arcuate formation in plan and are substantially equally spaced circumferentially of said flange, each said slot being adapted to slidably accommodate its associated post.

5. Apparatus according to claim 2 wherein said guide means include a plurality of swinging arms, one for each of said posts, and which are of substantially the same effective length and pivotally connected to said flange at circumferentially spaced points which are equidistantly spaced from each other and from said main axis so that the free ends of said arms which are connected to said posts may swing towards and away from said body portion, and said rotatable member and its associated pivoted links being located above said flange and said plurality of swinging arms being located below the flange so that said links and swinging arms are connected to said posts at opposite sides of the flange and thus maintain the posts in the desired substantially parallel relationship to each other and to said main axis during their inward and outward movements.

6. Apparatus according to claim 1 wherein each of said slots extends through a depending rib on the bottom of said flange, the lower surfaces of said slotted ribs being located in substantially the same plane at substantially right angles to said main axis.

References Cited in the file of this patent
UNITED STATES PATENTS
2,220,404    Huslander _____ Nov. 5, 1940
FOREIGN PATENTS
687,779    Great Britain _____ Feb. 18, 1953